(12) United States Patent
Nielsen

(10) Patent No.: US 9,658,090 B2
(45) Date of Patent: *May 23, 2017

(54) ULTRASONIC FLOW METER UNIT HAVING A FIXING MECHANISM TO FIX THE WATER-TIGHT CASING INCLUDING A MEMBRANE TO A HOUSING INCLUDING A MEASURING TUBE

(71) Applicant: Kamstrup A/S, Skanderborg (DK)

(72) Inventor: Søren Tønnes Nielsen, Solbjerg (DK)

(73) Assignee: KAMSTRUP A/S, Skanderborg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/789,604

(22) Filed: Jul. 1, 2015

(65) Prior Publication Data

US 2015/0377668 A1 Dec. 31, 2015

Related U.S. Application Data

(63) Continuation of application No. 13/255,724, filed as application No. PCT/DK2010/050066 on Mar. 25, 2010, now Pat. No. 9,335,192.

(30) Foreign Application Priority Data

Apr. 2, 2009 (EP) ..................................... 09157198

(51) Int. Cl.
  *G01F 1/66* (2006.01)
  *G01F 15/14* (2006.01)
(52) U.S. Cl.
  CPC ................ *G01F 1/66* (2013.01); *G01F 1/662* (2013.01); *G01F 1/667* (2013.01); *G01F 15/14* (2013.01)
(58) Field of Classification Search
  None
  See application file for complete search history.

(56) References Cited

U.S. PATENT DOCUMENTS

| | | |
|---|---|---|
| 400,331 A | 3/1889 | Graeser |
| 1,214,425 A | 1/1917 | Caston |

(Continued)

FOREIGN PATENT DOCUMENTS

| | | |
|---|---|---|
| CN | 1821724 A | 8/2006 |
| CN | 101243558 A | 8/2008 |

(Continued)

OTHER PUBLICATIONS

European Search Report for application No. EP 09157174, dated Jun. 25, 2009.

(Continued)

*Primary Examiner* — Harshad R Patel
(74) *Attorney, Agent, or Firm* — Knobbe Martens Olson & Bear LLP

(57) ABSTRACT

An ultrasound flow meter unit, e.g., a unit forming part of a flow meter for ultrasonic measurement of a fluid flow. The unit comprises two ultrasound transducers 206, a circuit board 202 with an electronic circuit 204 arranged for operating the ultrasound transducers 206, and a common protection membrane 132, such as a sheet of metal, for protecting the transducers 206. The common protection membrane 132 forms part of a water-tight casing, such as an IP68 class casing. The two ultrasound transducers 206 and the circuit board 202 with the electronic circuit 204 are positioned within the water-tight casing and thus protected against damaging humidity. A glass sealed feed-through 128 can be used to provide external electrical contact to the electronic circuit 204, i.e. for outputting an electric flow rate signal. Such flow meter unit is highly versatile within many applications since it provides a compact and robust unit. The unit can be used with or integrated in many types of devices, e.g. flow meters, such as used in consumption meters for (Continued)

charging purposes or in many other industrial or home applications.

14 Claims, 4 Drawing Sheets

(56) References Cited

U.S. PATENT DOCUMENTS

| | | | |
|---|---|---|---|
| 1,473,751 A | 11/1923 | Walker | |
| 2,746,291 A | 5/1956 | Swengel | |
| 3,237,453 A | 3/1966 | Yamamoto | |
| 3,653,259 A | 4/1972 | McShane | |
| 4,302,066 A | 11/1981 | Newman et al. | |
| 4,308,754 A | 1/1982 | Pedersen et al. | |
| 4,454,767 A | 6/1984 | Shinkai et al. | |
| 4,871,323 A | 10/1989 | Ohsumi | |
| 5,160,175 A | 11/1992 | Yang et al. | |
| 6,058,786 A | 5/2000 | Wallén et al. | |
| 6,508,134 B1 | 1/2003 | Feller | |
| 6,612,306 B1 | 9/2003 | Mault | |
| 6,799,475 B2 | 10/2004 | Van Klooster | |
| 7,634,950 B2 * | 12/2009 | Rhodes .................. | G01F 1/667 73/861.27 |
| 8,596,140 B2 | 12/2013 | Skallebaek et al. | |
| 8,806,957 B2 | 8/2014 | Laursen et al. | |
| 8,893,559 B2 | 11/2014 | Drachmann | |
| 2005/0087025 A1 | 4/2005 | Moscaritolo et al. | |
| 2007/0227263 A1 | 10/2007 | Fukano et al. | |
| 2008/0236296 A1 | 10/2008 | Sonnenberg et al. | |
| 2008/0271543 A1 | 11/2008 | Hecht et al. | |
| 2010/0011867 A1 | 1/2010 | Van Klooster et al. | |
| 2012/0006127 A1 | 1/2012 | Nielsen | |
| 2013/0031988 A1 | 2/2013 | Drachmann | |
| 2015/0033873 A1 | 2/2015 | Drachmann | |

FOREIGN PATENT DOCUMENTS

| | | |
|---|---|---|
| CN | 201795820 U | 4/2011 |
| DE | 92 02 970 U1 | 9/1992 |
| DE | 198 10 798 | 9/1998 |
| DE | 100 48 959 | 3/2001 |
| DE | 100 51 534 A1 | 4/2002 |
| DE | 20 2007 011 493 U1 | 11/2007 |
| DE | 10 2007 011 547 A1 | 9/2008 |
| DE | 20 2008 014 171 U1 | 4/2010 |
| DK | 177040 B1 | 10/2011 |
| EP | 0813041 A1 | 12/1997 |
| EP | 0846936 A1 | 6/1998 |
| EP | 0890826 A1 | 1/1999 |
| EP | 0897101 A1 | 2/1999 |
| EP | 0945712 A1 | 9/1999 |
| EP | 0952430 A1 | 10/1999 |
| EP | 0969286 A2 | 1/2000 |
| EP | 1136 794 A2 | 9/2001 |
| EP | 1227303 A2 | 7/2002 |
| EP | 1361417 A2 | 11/2003 |
| EP | 1435511 A2 | 7/2004 |
| EP | 1482284 A1 | 12/2004 |
| EP | 1760436 A2 | 3/2007 |
| EP | 1798528 A1 | 6/2007 |
| EP | 1742024 A1 | 10/2007 |
| EP | 1962098 A1 | 8/2008 |
| EP | 1962310 A1 | 8/2008 |
| EP | 1967828 A1 | 9/2008 |
| EP | 1983311 A2 | 10/2008 |
| EP | 2000784 A1 | 12/2008 |
| EP | 2000788 A1 | 12/2008 |
| EP | 2037231 A1 | 3/2009 |
| EP | 2042837 A1 | 4/2009 |
| EP | 2048482 A1 | 4/2009 |
| EP | 2075553 A1 | 7/2009 |
| EP | 2083250 A1 | 7/2009 |
| EP | 2083251 A1 | 7/2009 |
| EP | 2083406 A1 | 7/2009 |
| EP | 2088706 A2 | 8/2009 |
| EP | 2131162 A1 | 12/2009 |
| EP | 2187174 A1 | 5/2010 |
| EP | 2236992 A1 | 10/2010 |
| EP | 2236993 A1 | 10/2010 |
| EP | 2236998 A1 | 10/2010 |
| EP | 2339301 A1 | 6/2011 |
| EP | 2383550 | 11/2011 |
| FR | 1355584 | 2/1964 |
| GB | 2359140 A | 8/2001 |
| GB | 2423363 | 8/2006 |
| JP | 2006-275686 | 10/2006 |
| WO | WO 94/04890 | 3/1994 |
| WO | WO 95/04258 | 2/1995 |
| WO | WO 02/02522 A1 | 3/2002 |
| WO | WO 2004/111968 A2 | 12/2004 |
| WO | WO 2005/091433 A1 | 9/2005 |
| WO | WO 2007/020375 A1 | 2/2007 |
| WO | WO 2008/053193 A1 | 5/2008 |
| WO | WO 2008/129050 A1 | 10/2008 |
| WO | WO 2009/029533 A1 | 3/2009 |
| WO | WO 2009/121885 A1 | 3/2009 |
| WO | WO 2010/009973 A1 | 1/2010 |
| WO | WO 2010/112029 A1 | 7/2010 |

OTHER PUBLICATIONS

European Search Report for application No. EP 09157198, dated Jun. 18, 2009.
European Search Report for application No. EP 09 179932, dated Aug. 9, 2010.
European Search Report for application No. EP 11182505, dated Dec. 20, 2011.
International Search Report for application No. PCT/DK2012/050346, dated Mar. 1, 2013.
Petition for Inter Partes Review of U.S. Pat. No. 8,893,55 in IPR2015-01403.
Preliminary Amendment filed in U.S. Appl. No. 14/789,578 on Jul. 2, 2015.
Request for Continued Examination and Amendment filed in U.S. Appl. No. 13/255,724 on Jul. 1, 2015.
Specification of U.S. Appl. No. 14/789,578 on Jul. 1, 2015.

* cited by examiner

ULTRASONIC FLOW METER UNIT HAVING A FIXING MECHANISM TO FIX THE WATER-TIGHT CASING INCLUDING A MEMBRANE TO A HOUSING INCLUDING A MEASURING TUBE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 13/255,724, filed as PCT Application PCT/DK2010/050066 on Mar. 25, 2010 the entire contents of which are hereby incorporated by reference.

BACKGROUND

Field of the Invention

The invention relates to an ultrasound flow meter unit, such as for ultrasonic measurements of fluid flow as used e.g. in consumption meter. In particular the invention provides an ultrasound flow meter unit with a water-tight casing.

Description of the Related Art

Normally, ultrasound flow meters suited for measuring a fluid flow in connection with charging of a consumed quantity (e. g. heat, cooling, water or gas) will have a housing, which can be metallic or polymeric, with a cavity in the form of a through-going hole for receiving a fluid flow to be measured. Connection means to other fluid flow elements are present in each of the housing ends.

In the housing a number of ultrasound transducers are installed for measuring the velocity of the fluid flow. In most flow meters two ultrasound transducers are used for sending, respectively receiving, an ultrasound signal, but versions with one ultrasound transducer, as well as versions with more than two ultrasound transducers, are seen. Furthermore, an electronic circuit for operation of the ultrasound transducers typically mounted in a separate enclosure and fastened to the housing. Most often the electronic circuit is implemented on a Printed Circuit Board (PCB).

In typical metallic flow meter housings, through-going holes are present between the exterior of the housing and the measuring tube, enabling ultrasonic signals to penetrate from the exterior of the housing, through the holes, to the measuring tube. The through-going holes are necessary since the ultrasonic signals are poor at penetrating directly through metallic materials. In order to protect the ultrasound transducers from the effects of contact with the fluid flowing through the housing, a protection membrane is inserted between the fluid and the ultrasound transducer. More specifically, each of the ultrasound transducers is glued onto a thin, sheet metal membrane then put into an injection moulded polymeric part, which also contains the electrical connection to the ultrasound transducer. This subassembly is then placed in the flow meter housing.

However, one common problem with prior art ultrasound flow meters is that the level of complexity, and consequently high expenditures and large timeframes, involved with the manufacturing are too high.

A further problem is that the mentioned way of manufacturing an ultrasound flow meter necessitates that several parts are dedicated for used with one specific type of housing, and thus a large number of specially designed parts must be manufactured for each flow meter version.

Still further, it is a problem that it is difficult to protect electronic parts of a flow meter against humidity such that these parts can have a long life-time, e.g. of 20 years, even if the meter is installed in a humid environment.

In WO 2008/129050 a device for determining and/or monitoring the volume and/or mass flow of a medium flowing through a conduit is disclosed. In this disclosure two ultrasound sensors are mounted on a base plate, and at least one of the ultrasound sensors is movable relative to the second ultrasound sensor. Fastening means are provided via which the device can be clamped on a fluid pipe. The device is a so-called clamp-on sensor where the ultrasonic signals are coupled in to the pipe through the base-plate and through the pipe wall.

In DE 920 29 70U a device for measuring a fluid stream in a pipe line is disclosed. Ultrasonic transducers are placed inside a casing enveloping the pipe line. Ultrasonic signals are coupled in to the pipe line through the pipe wall In EP 0 945 712 A discloses a device for measuring a gas flow, the device comprises ultrasonic transmitting and receiving units which are aligned against openings of a measuring chamber. Diaphragms are arranged between the measuring chamber and the transmitter and receiver unit. The diaphragms are permeable for ultrasonic waves, but substantially impermeable for moisture and bacteria. Each transducer has a separate diaphragm and is not positioned within a common casing.

SUMMARY

In view of the above, it may be seen as an object of the present invention to provide an improved ultrasound flow meter for ultrasonic measurement of a fluid flow and an improved method of manufacturing of a flow meter which has a lower level of complexity than methods of manufacturing applied in the prior art, and still the meter should provide a high versatility and provide a long life-time.

Accordingly, the invention provides, in a first aspect, an ultrasound flow meter unit arranged to measure a flow rate of a fluid.

Such unit is advantageous, since the water-tight casing around the transducers and electronic circuit serve to protect these parts against humidity, and thus even if the unit is used for a cooling meter, the sensitive parts are protected against humidity which ensures a long life-time of these parts. Still, the common protection membrane is understood to allow penetration of ultrasound signals to and from the first and second ultrasound transducers, preferably the first and second ultrasound transducer are arranged such within the water-tight casing, that they transmit and receive ultrasound signals through the common protection membrane in a direction substantially parallel with each other, and wherein this direction is preferably perpendicular to a plane extended by the common protection membrane.

By 'water-tight casing' is understood a casing which at least serves to protect the components inside with respect to humidity. Such humidity will otherwise be generated on these components in case it is used as a cooling meter, i.e. where the components have a low temperature and wherein the humidity in the surroundings is rather high. Thus, at least the water-tight casing should be able to protect against such humidity, and in terms of Ingress Protection (IP) classes, the water-tight casing is understood to comply at least with class IP65 (Protected against low-pressure jets from all directions—limited ingress permitted). Preferably, the casing also complies with class IP66 (Protected against direct sprays from all directions—limited ingress permitted), class IP67 (Protection against effects of immersion from 15 cm to 1 m) or even class IP68 (Protection against complete, continuous submersion in water from 15 m or 50 feet.

For versions where the common protection membrane is arranged to protect the transducers against direct contact with the fluid to be measured, this common protection membrane should of course be able to seal the transducers from the fluid in question, i.e. including possible particles in the fluid that will cause mechanical wear on the common protection membrane.

Further, such unit provides a high versatility, since it can be used in a large number of different applications, i.e. mounted on different types of housing and measuring tube arrangements, whether forming part of a consumption meter or forming part of another type of application where a measurement of fluid flow is required. The unit is highly suited for different applications and can thus be manufactured as a low cost component, since one single version can fit many applications, thus enabling large scale manufacturing using a highly automated production line. Still further, the manufacturing is facilitated by the rather low number of single element required thus also reducing the necessary number of single manufacturing steps, especially in versions where the transducers are soldered directly onto the surface of the circuit board using automated Surface Mounting Technology.

The invention provides a highly versatile stand-alone unit for a large variety of applications where a flow rate of a fluid is to be measured. A simple electrical interface can be provided, e.g. where the measured flow rate is output as pulses. This interface may be reduced down to one single electrical pin, see e.g. European patent application publication No. EP 2 042 837, e.g. with part of the casing being a metal serving as electrical ground connector. Hereby, the unit is easy to fit into different applications. In some embodiments, a battery is provided within the water-tight casing, thus allowing a completely self-contained flow meter unit with a simple electric interface.

Further, the range of applications is extended due to the rather compact size of the unit, especially in versions where the electronic circuit is refined to allow a high measurement accuracy with a limited distance between the first and second ultrasound transducers, e.g. as described in European patent application EP 2 339 301. This means that the unit can be used in applications where only a limited space is available for the flow rate sensor.

Examples of relevant applications are: consumption meters for charging purposes, measurement of blood flow in medical examination or surveillance, ingredient flow within the food industry, flow of water, air or fuel in a machinery (e.g. a vehicle), flow provided to single sources or groups of heating/cooling elements (or the related heating/cooling power based on measurement of the flow) as feedback to heating/cooling control systems.

In another embodiment, the water-tight casing comprises, on its surface an electrical connector with at least one pin electrically connected to the electronic circuit on the circuit board, e.g. two pins or more may be electrically connected to the electronic circuit. This allows connection electrically to the electronic circuit present inside the water-tight casing, from the exterior of the water-tight casing, and thus provides the electrical interface of the unit. The number of pins in the electrical connector depends on the electrical interface, but the flow rate from the unit can be communicated by means of only a one-pin interface, as already mentioned. More pins may be preferred, e.g. for supply of electrical power to the electronic circuit. A part of the water-tight casing, e.g. the common protection membrane may be formed by a metal and thus provide an external electrical ground connection. The electrical connector preferably penetrates the water-tight casing, such as by means of a sealed feed-through which is water-tight, thus allowing the flow meter unit to comply with IP68 classification. In an advantageous embodiment, the sealed feed-through is a glass sealed feed-through which is a type of feed-through which is capable of maintaining a water-tight sealing for a long period of time. However, other types of sealed feed-through implementations may be used as well, such as known by the skilled person.

Preferably, the common protection membrane forms a bottom part of the water-tight casing, and wherein a top part of the water-tight casing is connected to the bottom part, such as connected by a warm-forming process in the form of soldering or welding. Different types of welding can be used, such as laser welding or ultrasound welding. Thus, in such embodiment the water-tight casing is made of two monolithic parts, either two parts of the same material of two parts of different materials.

In a preferred embodiment, the common protection membrane is made of metal, e.g. stainless steel, and wherein the common protection membrane serves to electrically connect both of the first and second ultrasound transducer, such as to connect both of the first and second ultrasound transducer electrically to an electrical ground. This is advantageous since it enables the ultrasound transducers to be connected electrically with devices outside the water-tight casing through the electrically conducting casing. Further, the electronic circuit may be connected to the electrical ground terminals of the two transducers via the common protection membrane. In other embodiments the common protection membrane is formed by a polymeric material, such as PPS.

The common protection membrane may have first and second recesses shaped so as to receive the first and second ultrasound transducers, respectively. This facilitates the mounting of the ultrasound transducers with respect to the common protection membrane.

Preferably, the first and second ultrasound transducers form a mechanically separate unit together with the circuit board, preferably using Surface Mounting Technology for mounting the two ultrasound transducers on the circuit board. This is essential for effective production, since the mechanically separate unit including transducers and circuit board forms already a functioning unit before this separate unit is mounted in the water-tight casing. Thus, before the final assembly steps of mounting this separate unit in the water-tight casing, it can be tested in a test setup and thus rejected at an early state prior to providing the final flow meter unit. Hereby, the production cost can be lowered since failing species are revealed at an early state, and in addition the rather complex handling of wires and connecting of wires between transducers and circuit board in automated manufacturing has been eliminated. Also, a more reliable flow meter can be achieved due to fewer parts and connections. Moreover, this can also lead to an increase in lifetime of the ultrasound flow meter. In addition, higher precision is possible as a result of reduced tolerances.

In a preferred embodiment the first and second ultrasound transducers are kept in position relative to the circuit board by one or more fixing members, especially such fixing members may include solderings and/or clips, especially electrically conductive clips. Most preferably, at least one electrical terminal for each of the two transducers is soldered directly to a conductive path on a surface of the circuit board so as to both electrically connect the transducers to the electronic circuit and to mechanically fix the transducers to the circuit board. As mentioned, the other electrical terminals of the transducers are then in electrical connection with the common protection membrane being formed by metal.

The ultrasound flow meter unit may be part of a device, such as a stand-alone flow meter or another type of device in which the ultrasound flow meter unit forms an integrated part or forms an interchangeable part, e.g. a part connected to the other part of the device with a plug and socket connection.

In a second aspect, the invention provides a flow meter arranged to measure a flow rate of a fluid flowing through a measuring tube.

The flow meter may form part of a consumption meter in the form of a heat meter, a cooling meter, a water meter, or a gas meter.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
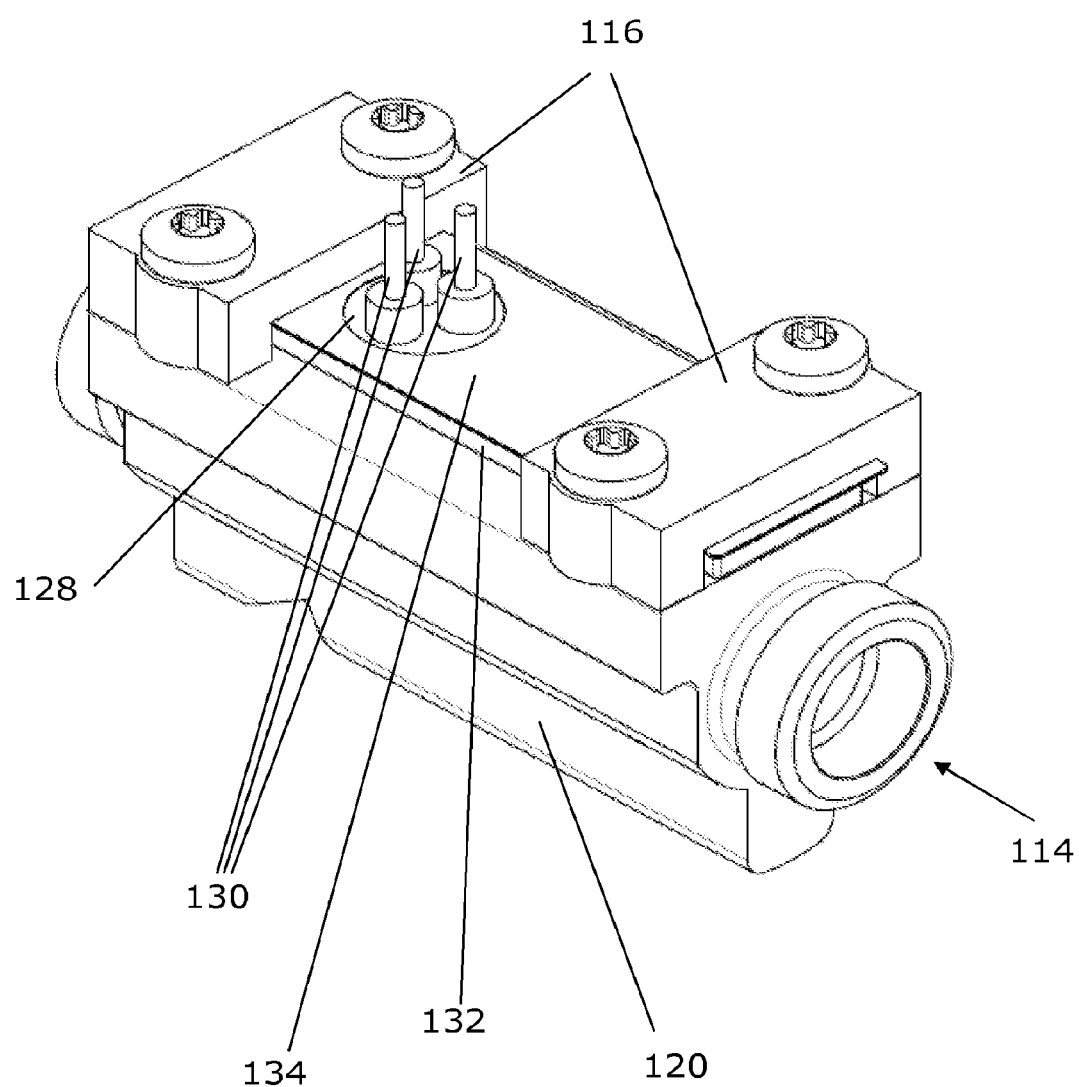
FIG. 1 illustrates an ultrasound flow meter with a common protection membrane.

FIG. 1 shows a perspective view of an ultrasound flow meter with a metallic flow meter housing 120, with a measuring tube 114 adapted for fluid flow inside. Attached to the flow meter housing 120 is a water-tight casing enclosing two ultrasound transducers and a circuit board with an electronic circuit for controlling the ultrasound transducers. The water-tight casing comprises a top-part 134 and a common protection membrane 132. The common protection membrane 132 is metallic in the shown embodiments, but other embodiments where the common protection membrane 132 is made of other materials, such as polymeric materials, are possible. The two parts 132, 134 forming the water-tight casing may be assembled in different ways, e.g. using a welding process in case both parts 132, 134 are of metal, however the two parts 132, 134 are preferably shaped to match together and the assembly process is selected so as to form a robust water-tight sealing between the two parts, e.g. using the principles known from manufacturing metal containers such as tins or cans.

Electrical connection to the electronic circuit from the exterior of the water-tight casing is provided through pins 130, which are led through a glass seal 128 forming a glass-sealed feed-through. In a preferred embodiment, the mounting flange of the glass sealed feed-through is laser welded to the casing top-part ensuring an impervious assembly. The shown embodiment has three pins, however, other numbers of pins are possible in other embodiments, e.g. down to one pin, as already described. The bracing 116 assists in fixing the water-tight casing. The glass sealed feed-through is merely shown as an example of feed-through implementations, and other implementations may be used as well.

In special embodiments of the measurement unit (circuit board with measurement circuit and ultrasound transducers), e.g. in the form of a water-tightly sealed measurement unit, more pins 130 can be provided in order to enable different angular engagements to a corresponding connector attached to a second unit, a calculator unit, including a calculator circuit and a display element arranged to display a measured quantity. Hereby, a consumption meter can be provided with the possibility of turning the display relative to the measurement unit which is normally fixed in relation to a housing, even though the calculator unit is integrated with the measurement unit, such as within one common casing, e.g. one common casing formed integrally with the housing. Such consumption meter is advantageous since it is easy to adapt for comfortable reading of the display in any given piping installation, irrespective of the actual orientation of the consumption meter housing. During installation, the installing person can connect the calculator unit with the measurement unit at an appropriate angle which fits for comfortable reading of the display in the given installation.

Figure 2:
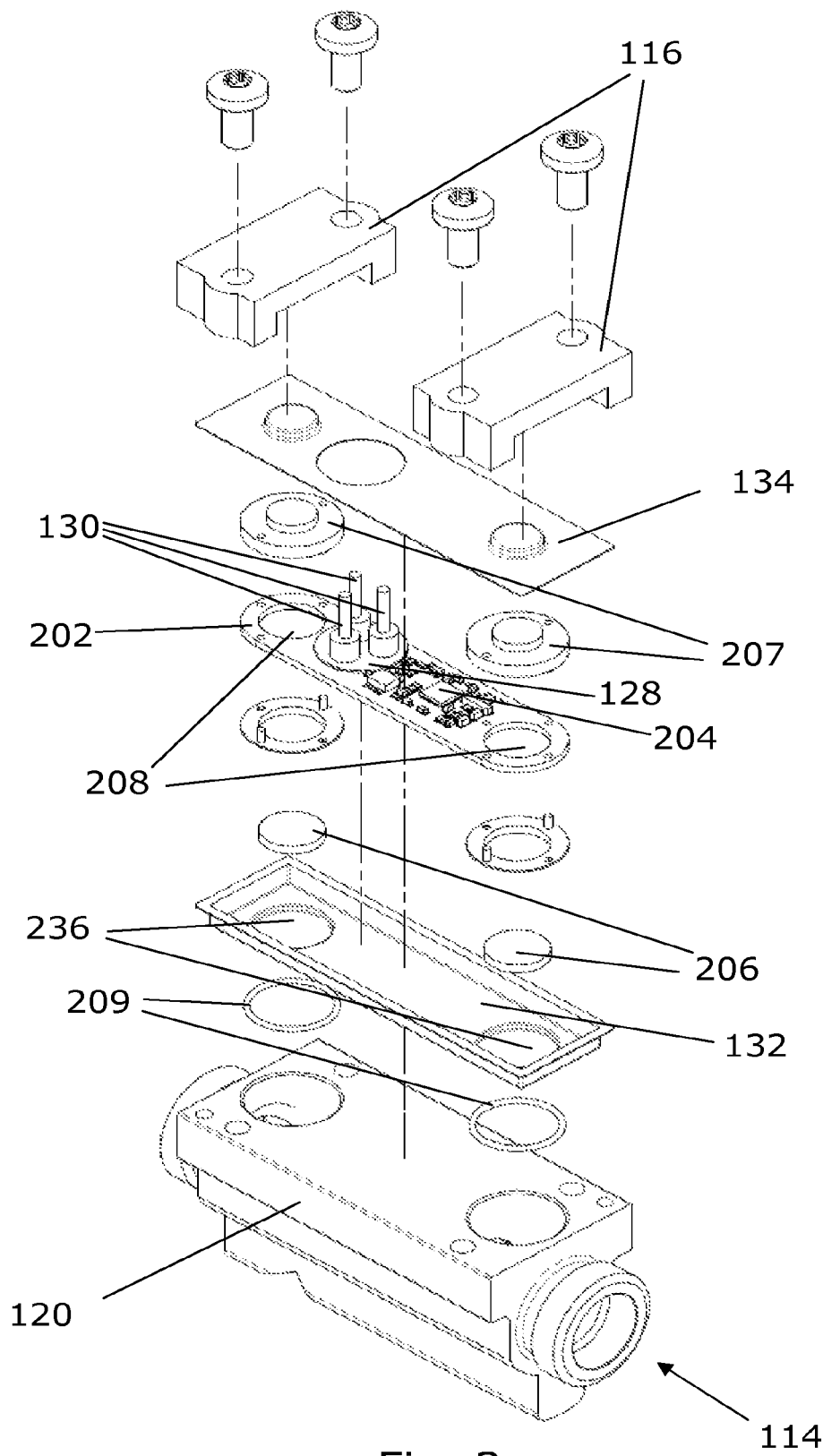
FIG. 2 illustrates an exploded view of an ultrasound flow meter with a common protection membrane.

FIG. 2 shows an exploded view of an ultrasound flow meter similar to the ultrasound flow meter shown in FIG. 1. In FIG. 2, the components of the ultrasound flow meter unit are illustrated, including top-part 134 of the water-tight casing, pins 130, glass seal 128, first and second ultrasound transducers 206, the circuit board 202, through-going holes 208 in the circuit board, electronic circuit 204, the common protection membrane 132, flow meter housing 120 with a measuring tube 114 inside. The ultrasound transducers 206 in the shown embodiment are ceramic, piezoelectric elements. Preferably, the transducers 206 are at least partly electrically connected to and mechanically attached to the circuit board 202 by means of Surface Mounting Technology. The common protection membrane 132 of the shown embodiment has first and second recesses 236 shaped so as to receive the first and second ultrasound transducers 206, respectively. In the shown embodiment, the distance between the first and second recesses 236 matches a distance between a first and second ultrasound transducer 206 arranged in connection with the circuit board 202. Furthermore, this distance matches a distance between a first and second transducer receiving position of the housing 120.

A hole in the top-part 134 is included for the protrusion of a glass sealed feed-through. In a preferred embodiment of the invention the common protection membrane 132 is formed by deep drawing. In another preferred embodiment of the invention the common protection membrane 132 can be formed by deep drawing or die punching. Similarly, the top-part 134 could be formed by either deep drawing or die punching. In an advantageous embodiment, the material thickness of the top-part 134 is larger than a corresponding material thickness of the common protection membrane 132.

The shape and dimensions of the common protection membrane 132 and the top-part 134 is preferably arranged so that the ultrasound transducer 206 can be fixed in position in relation to the housing 120, e.g. by means of an intermediate element 207 as shown serving to fix the transducer between the common protection membrane 132 and the top-part 134. The bracing 116 is provided in order to fix the position of the transducer 206 to the housing. The bracing 116 in the shown embodiment is provided with mounting means in the form of holes for screwed connections for the mounting of the bracing onto the flow meter housing 120. Hereby, the bracing 116 serves to press the common protection membrane 132 against the housing 120 and thus serves to provide a water-tight sealing to the housing 120 by means of the intermediate flexible O-ring 209 being pressed between the common protection membrane 132 and the housing 120.

In a favoured embodiment, the top-part 134 and the bracing 116 are integrated, possibly monolithically, e.g. the mounting means of the bracing 116 could be in the form of flanges. The through-going holes 208 together with one or more fixing members are suited for fixing the ultrasound transducers 206 to the circuit board 202 in order to provide a mechanically separate unit comprising circuit board 202 and ultrasound transducers 206. Alternative embodiments have non-through-going cavities or planar surfaces instead of through-going holes.

Figure 3A:
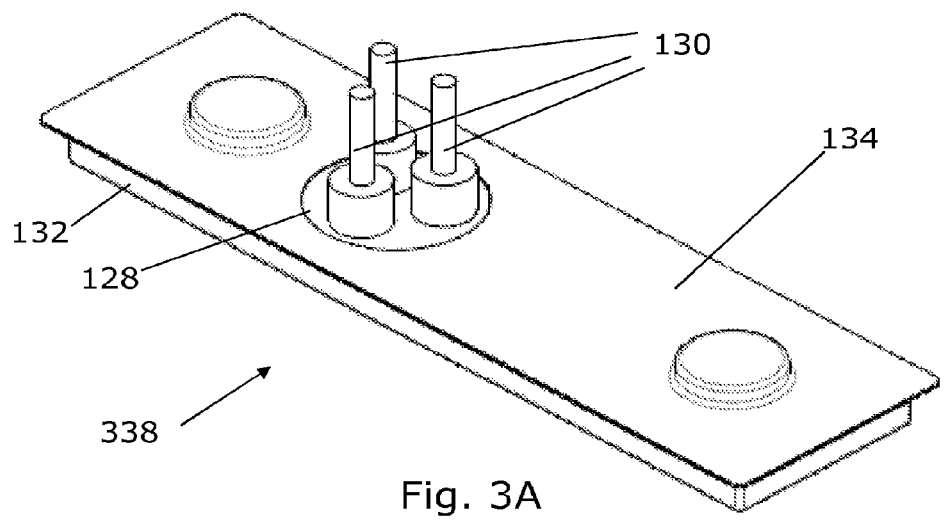
FIG. 3A illustrates a water-tight casing.

FIG. 3A shows a perspective view of a water-tight casing 338 in which a mechanically separate unit consisting of a circuit board and ultrasound transducers is placed, enclosed by the water-tight casing which is formed as an enclosure comprising a top-part 134, a common protection membrane 132, and a glass seal 128. Electrical connection to the electronic circuit is provided through pins 130, which are led through a glass seal 128, forming a glass-sealed feed-through. The shown embodiment is capable of being submerged in liquid without the intrusion of liquid or moisture, and without the occurrence of any harmful effects due to the submersion in liquid. The shown embodiment is classified as IP68 according to the standard IEC 60529, however, other embodiments with other classifications are possible provided that the casing is water-tight, such as already described.

Figure 3B:
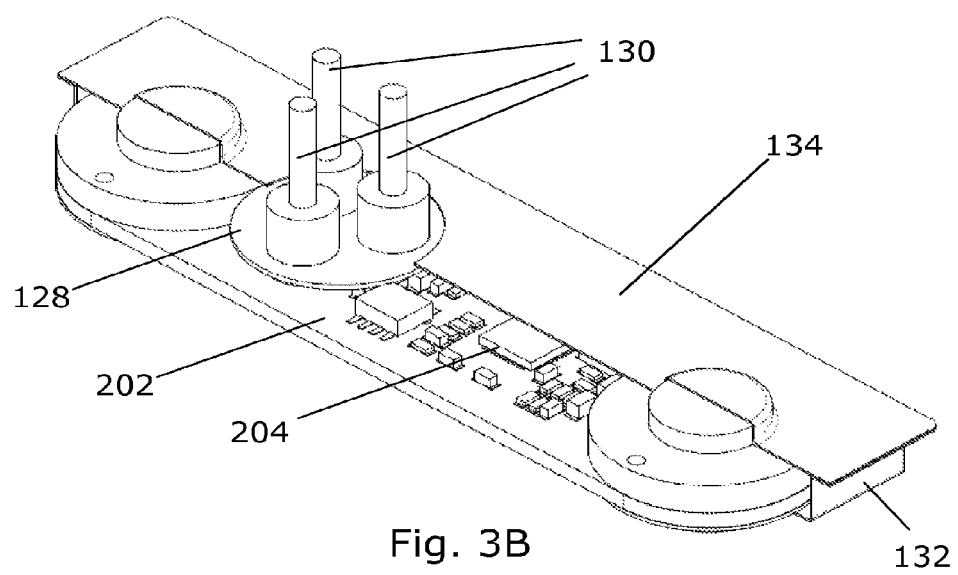
FIG. 3B is a cutaway illustration of a water-tight casing.

FIG. 3B shows a cutaway drawing of the embodiment of FIG. 3A, where approximately half of the common protection membrane 132 and half of the top-part 134 are not shown. This enables the presentation of the interior of the water-tight casing comprising a circuit board 202 with electronic circuit 204 and ultrasound transducers fixed to it. Electrical connection to the electronic circuit from the exterior of the water-tight casing is provided through pins 130, which are led through glass seal 128, forming a glass-sealed feed-through. Furthermore, in the present embodiment, the electrically conducting common protection membrane is connected to electrical ground as well as to both of the ultrasound transducers, thus serving to connect both of the ultrasound transducers to electrical ground. The components of the electronic circuit 204 in the shown embodiment comprise Surface Mounted Device (SMD) components, i.e. components adapted to Surface Mounting Technology, preferably in the same process in which the transducers are mounted on the circuit board 202.

In the present embodiment the top-part 134 and common protection membrane 132 are connected to each other by soldering. However, in alternative embodiments connection might be done by laser welding. Laser welding is advantageous, since it enables local heating of materials which makes it possible to weld with only small heat deflections. In a further alternative embodiment the connection is made by sealing by elastic forces, such as snap fittings. In still further alternative embodiments, the casing is sealed with glue or the sealing is done by applying counteracting forces onto adjacent surfaces facing each other, the forces being applied in order to press the surfaces together, wherein one or more sealing materials between the surfaces may be present. Even further, the top-part 134 and the common protection membrane 132 can be connected together by means of screws.

Figure 4:
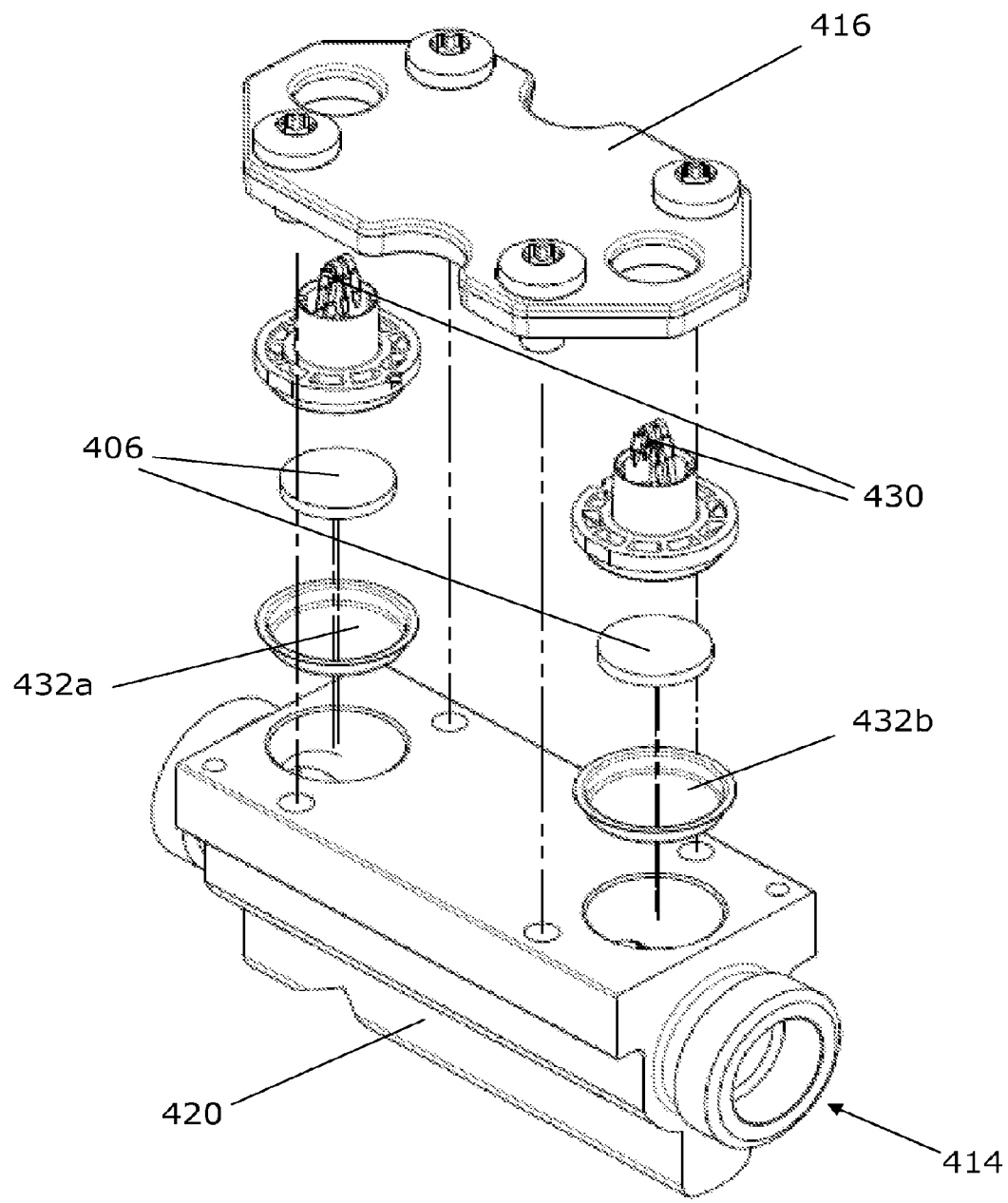
FIG. 4 illustrates an ultrasound flow meter of the prior art with separate metal protection membranes for the two ultrasound transducers.

FIG. 4 shows a perspective view of a prior art ultrasound flow meter with a metallic flow meter housing 420, with a measuring tube 414 adapted for fluid flow inside. Attached to the flow meter housing are a first protection membrane 432a and a second protection membrane 432b for shielding the ultrasound transducers 406 from direct contact with the fluid flowing inside the housing during operation. Also shown are pins 430 for electrical connection between the ultrasound transducers 406 and an electronic circuit for operating the transducers 406. A bracing 416 serves to press the transducers 406 against the housing 420.

In such prior art embodiment, the ultrasound transducers and the electronic circuit for operating the transducers (not shown) are not protected against humidity, and thus such flow meter is not suited for use in a cooling meter, since transducers and electronics would then be damaged due to humidity caused by condensing due to the low temperature of the cooling fluid, and furthermore a complete assembly of the transducers 406, the electronic circuit and the housing 420 is required before the function of the meter can be tested. These disadvantages are remedied by the flow meter unit according to the invention.

To sum up, the invention provides an ultrasound flow meter unit, e.g. a unit forming part of a flow meter for ultrasonic measurement of a fluid flow. The unit comprises two ultrasound transducers 206, a circuit board 202 with an electronic circuit 204 arranged for operating the ultrasound transducers 206, and a common protection membrane 132, such as a sheet of metal, for protecting the transducers 206. The common protection membrane 132 forms part of a water-tight casing, such as an IP68 class casing. The two ultrasound transducers 206 and the circuit board 202 with the electronic circuit 204 are positioned within the water-tight casing and thus protected against damaging humidity. A glass sealed feed-through 128 can be used to provide external electrical contact to the electronic circuit 204, i.e. for outputting an electric flow rate signal. Such flow meter unit is highly versatile within many applications since it provides a compact and robust unit. The unit can be used with or integrated in many types of devices, e.g. flow meters, such as used in consumption meters for charging purposes or in many other industrial or home applications.

Although the present invention has been described in connection with preferred embodiments, it is not intended to be limited to the specific form set forth herein. Rather, the scope of the present invention is limited only by the accompanying claims.

In this section, certain specific details of the disclosed embodiments are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a

What is claimed is:

1. An ultrasonic consumption meter comprising:
a housing containing a measuring tube for a fluid to be measured;
two ultrasonic transducers for emitting and receiving ultrasound;
an electronic circuit for operating the meter; and,
a water tight casing in which the two transducers and the electronic circuit are enclosed, wherein a wall of the casing has two recesses shaped to receive the two ultrasonic transducers, wherein the two ultrasonic transducers are positioned in the two recesses so that the ultrasound signal penetrates the wall, and wherein the two transducers are coupled within the casing to the electronic circuit;
wherein the ultrasonic consumption meter comprises a fixing mechanism that fixes the casing in position relative to the housing containing the measuring tube; and
wherein the housing containing the measuring tube has two holes positioned to receive the recesses in the casing when the fixing mechanism has fixed the casing in position relative to the housing containing the measuring tube such that the recesses containing the two ultrasonic transducers can contact the fluid to allow ultrasound signals to travel between the two ultrasound transducers through the fluid.

2. The ultrasonic consumption meter of claim 1, further comprising a seal between the housing containing the measuring tube and the casing.

3. The ultrasonic consumption meter of claim 2, wherein the seal comprises O-rings.

4. The ultrasonic consumption meter of claim 2, wherein the seal comprises two sealing elements arranged around each of the two holes, respectively.

5. The ultrasonic consumption meter of claim 4, wherein the two sealing elements are O-rings.

6. The ultrasonic consumption meter of claim 1, wherein said two holes are arranged along an axis parallel to a length of the measuring tube.

7. The ultrasonic consumption meter of claim 1, wherein the two holes are arranged on the same side of the measuring tube.

8. The ultrasonic consumption meter according to claim 1, wherein the fixing mechanism comprises holes for screw connections in the housing containing the measuring tube to fix the casing to the housing containing the measuring tube with screws.

9. The ultrasonic consumption meter of claim 8, wherein the fixing mechanism is configured such that the screws are inserted and extracted by a movement perpendicular to the length of the measuring tube.

10. The ultrasonic consumption meter of claim 1, wherein the consumption meter is a water meter.

11. The ultrasonic consumption meter of claim 1, wherein the consumption meter is a gas meter.

12. The ultrasonic consumption meter of claim 1, wherein the casing is formed from a bottom protection membrane, a top part, and a water tight seal.

13. The ultrasonic consumption meter of claim 1, wherein the consumption meter is either a stand-alone flow meter with the casing as an integral part or where the casing is an interchangeable part connected to another part of a device with a plug and socket connection.

14. The ultrasonic consumption meter of claim 1, wherein the wall of the casing having the two recesses is made of a polymeric material.

* * * * *